(12) United States Patent
Tamura et al.

(10) Patent No.: US 10,675,965 B2
(45) Date of Patent: Jun. 9, 2020

(54) IN-WHEEL MOTOR DRIVING DEVICE

(71) Applicant: NTN CORPORATION, Osaka (JP)

(72) Inventors: Shiro Tamura, Shizuoka (JP); Shinya Taikou, Shizuoka (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 16/078,053

(22) PCT Filed: Oct. 12, 2016

(86) PCT No.: PCT/JP2016/080166
§ 371 (c)(1),
(2) Date: Aug. 21, 2018

(87) PCT Pub. No.: WO2017/154255
PCT Pub. Date: Sep. 14, 2017

(65) Prior Publication Data
US 2019/0047400 A1 Feb. 14, 2019

(30) Foreign Application Priority Data
Mar. 8, 2016 (JP) .................................. 2016-044679

(51) Int. Cl.
*B60K 7/00* (2006.01)
*B60K 17/14* (2006.01)
(Continued)

(52) U.S. Cl.
CPC .............. *B60K 7/0007* (2013.01); *B60K 7/00* (2013.01); *B60K 17/043* (2013.01); *B60K 17/14* (2013.01);
(Continued)

(58) Field of Classification Search
CPC ........ B60K 7/00; B60K 7/0007; B60K 17/14; B60K 2007/0061; B60K 2007/0067; F16H 1/06; F16H 1/20
See application file for complete search history.

(56) References Cited

U.S. PATENT DOCUMENTS 5,048,626 A * 9/1991 Strehler ............... B60K 7/0007
180/19.2
5,087,229 A 2/1992 Hewko et al.
(Continued)

FOREIGN PATENT DOCUMENTS

EP 3 424 764 1/2019
JP 05319111 A * 12/1993
(Continued)

*Primary Examiner* — James A Shriver, II
*Assistant Examiner* — Steve Clemmons
(74) *Attorney, Agent, or Firm* — Clark & Brody LP

(57) ABSTRACT

The speed reduction unit (31) of the in-wheel motor driving device (10) includes an input shaft (32), an output shaft (41) coupled to a wheel hub (12) and extending in parallel with the input shaft, one or more intermediate shafts (35, 38) extending in parallel with the input shaft and output shaft, an input gear (33) coupled to the input shaft, an output gear (40) coupled to the output shaft, and a plurality of intermediate gears (34, 36, 37, 39) coupled to the intermediate shaft. The input gear, intermediate gears, and output gear are engaged with one another to form a driving force transmission path connecting the input gear to the output gear through the intermediate gears. At least one intermediate gear (37) of the intermediate gears has a diameter greater than the diameter of the output gear.

6 Claims, 7 Drawing Sheets

(51) Int. Cl.
  *F16H 1/06* (2006.01)
  *B60K 17/04* (2006.01)
  *H02K 7/116* (2006.01)
  *H02K 7/14* (2006.01)
  *B60W 20/15* (2016.01)
  *B60W 10/08* (2006.01)

(52) U.S. Cl.
  CPC ............ *B60W 10/08* (2013.01); *B60W 20/15* (2016.01); *F16H 1/06* (2013.01); *H02K 7/116* (2013.01); *H02K 7/14* (2013.01); *B60G 2300/50* (2013.01); *B60K 2007/0038* (2013.01); *B60K 2007/0061* (2013.01); *B60L 2240/421* (2013.01); *B60L 2240/423* (2013.01)

(56) References Cited

U.S. PATENT DOCUMENTS

| | | | | |
|---|---|---|---|---|
| 5,691,584 A | * | 11/1997 | Toida | B60K 7/0007 180/65.51 |
| 5,907,973 A | * | 6/1999 | Van Wonterghem | B60K 17/08 180/374 |
| 7,370,714 B2 | * | 5/2008 | Yasuda | A01D 34/6806 180/305 |
| 9,130,412 B2 | * | 9/2015 | Tamura | B60K 17/356 |
| 9,403,429 B2 | * | 8/2016 | Baumgartner | B60K 7/0007 |
| 9,592,732 B2 | * | 3/2017 | Frohnmayer | B60K 17/08 |
| 9,821,649 B2 | * | 11/2017 | Ishikawa | F16D 1/10 |
| 2008/0035407 A1 | | 2/2008 | Murata et al. | |
| 2008/0223638 A1 | * | 9/2008 | Niwa | B60K 7/0007 180/65.51 |
| 2009/0019967 A1 | | 1/2009 | Himmelmann | |
| 2015/0266373 A1 | * | 9/2015 | Wang | B60K 17/08 180/364 |
| 2017/0320381 A1 | * | 11/2017 | Milton | B60K 1/04 |

FOREIGN PATENT DOCUMENTS

| | | | | |
|---|---|---|---|---|
| JP | 2008-184110 | | 8/2008 | |
| JP | 2008184110 | * | 8/2008 | |
| JP | 2012-201289 | | 10/2012 | |
| JP | 2013-209016 | | 10/2013 | |
| JP | 5677142 | | 2/2015 | |
| WO | WO-0035698 A1 | * | 6/2000 | .......... B60K 7/0015 |
| WO | 2005/030518 | | 4/2005 | |
| WO | WO-2014013084 A1 | * | 1/2014 | .......... B60K 7/0007 |

* cited by examiner outer side in vehicle width direction forward → forward forward forward

IN-WHEEL MOTOR DRIVING DEVICE

TECHNICAL FIELD

The present invention relates to an in-wheel motor driving device that is disposed inside a wheel assembly to drive the wheel, and more particularly, to an internal structure of the in-wheel motor driving device.

BACKGROUND ART

There are some well known systems employed for in-wheel motors: a direct drive system that transmits output rotation of the motor to the wheel assembly without reducing the speed at all; and a reducer-combined system that transmits output rotation of the motor to the wheel assembly while reducing the speed by a reducer. Conventional in-wheel motors of a reducer-combined system are disclosed in, for example, Japanese Unexamined Patent Application Publication Nos. 2013-209016 (PTL 1) and Japanese Patent No. 5677142 (PTL 2). The in-wheel motor disclosed in PTL 1 includes a parallel double-shaft gear reducer having an output shaft and an input shaft extending in parallel with each other. The in-wheel motor disclosed in PTL 2 includes a parallel triple-shaft gear reducer having an output shaft, an intermediate shaft, and an input shaft extending in parallel with one another.

CITATION LIST

Patent Literature

PTL 1: Japanese Unexamined Patent Application Publication No. 2013-209016
PTL 2: Japanese Patent No. 5677142

SUMMARY OF INVENTION

Technical Problem

The in-wheel motor disclosed in PTL 1 adopts the parallel double-shaft gear reducer that includes a single-stage reducer gear train to reduce the speed between the input shaft and output shaft. The in-wheel motor disclosed in PTL 2 adopts the parallel triple-shaft gear reducer that includes a two-stage reducer gear train composed of a single-stage reducer gear train between the input shaft and intermediate shaft and another single-stage reducer gear train between the intermediate shaft and output shaft. Having more intermediate shafts is more advantageous to increase the speed reduction ratio.

The in-wheel motor disclosed in PTL 2 adopting the parallel triple-shaft gear reducer has a speed reduction ratio greater than the parallel double-shaft gear reducer; however, the in-wheel motor disclosed in PTL 2 has reducers and motors disposed immediately above and below the axle, respectively, and therefore it is difficult to link a lower part of the in-wheel motor to a suspension in a narrow hollow area in the wheel assembly.

To overcome the difficulty, the first reference example as schematically shown in FIG. 5 suggests placing an in-wheel motor 200, which includes an axle 201, a parallel triple-shaft gear reducer 202, and a motor 203, in a hollow area 221 in the road wheel of a wheel assembly 220. The parallel triple-shaft gear reducer 202 includes an input shaft 204 coupled to a motor rotary shaft of the motor 203, an input gear 205 formed on an end of the input shaft 204, a first intermediate gear 206 in mesh with the input gear 205, a second intermediate gear 208 coupled to the first intermediate gear 206, an intermediate shaft 207 provided at the center of the intermediate gears, an output gear 209 in mesh with the second intermediate gear 208, and an output shaft 210 provided at the center of the output gear 209. The output shaft 210 is coaxially coupled to the axle 201. The in-wheel motor 200 is linked to a suspension, which is not illustrated, with the parallel triple-shaft gear reducer 202 and motor 203 located right above the axle 201. According to the first reference example, a space S can be left below the output gear 209 in the hollow area 221 in the road wheel. Therefore, a lower part of the in-wheel motor 200 can be coupled to the suspension in the space S.

The motor 203 in the first reference example, however, has a diameter that is too small to obtain a desired motor torque, and therefore the motor 203 needs to be longer in the direction of the rotary shaft. Such a long motor 203 would largely protrude from the hollow area 221 in the road wheel in the vehicle width direction, and interfere with the suspension which is not illustrated. Thus, the first reference example is not practical. On the other hand, increasing the diameter of the motor 203 decreases the distance between the input shaft 204 and output shaft 210, and as a result, the first intermediate gear 206 and second intermediate gear 208 cannot have adequate diameters.

In addition, in the first reference example, the diameter of the output gear 209 is greater than that of the first intermediate gear 206. To link the in-wheel motor 200 and suspension at a linkage point in the hollow area 221 of the road wheel, the linkage point needs to be located radially outside of the output gear 209, resultantly it is located away from the axle 201. Since the linkage point receives bending moment input from the road wheel to the wheel hub, such a far-off linkage point from the axle 201 adversely affects the suspension.

The present invention has been made in view of the aforementioned circumstances, and has an object to provide an in-wheel motor driving device that can achieve a sufficient speed reduction ratio and have a space in the road wheel.

Solution to Problem

To achieve the object, the in-wheel motor driving device according to the present invention includes a wheel hub bearing unit that rotatably supports a wheel hub extending in a vehicle width direction, a motor unit that drives the wheel hub, and a speed reduction unit that reduces the rotational speed of the motor unit and transmits the reduced rotational speed to the wheel hub bearing unit. The speed reduction unit includes an input shaft coupled to a motor rotary shaft of the motor unit, an output shaft coupled to the wheel hub and extending in parallel with the input shaft, one or more intermediate shafts extending in parallel with the input shaft and output shaft, an input gear coupled to the input shaft, an output gear coupled to the output shaft, and a plurality of intermediate gears coupled to the intermediate shaft(s). The input gear, the intermediate gears, and the output gear are engaged with one another to form a driving force transmission path connecting the input gear to the output gear through the intermediate gears. At least one of the intermediate gears has a diameter greater than the diameter of the output gear.

According to the present invention, the speed reduction unit having the input shaft, intermediate shaft(s), and output shaft extending in parallel with one another can serve as a parallel multi-shaft gear speed reducer that provides a sufficient speed reduction ratio. The output shaft is disposed at the center of a road wheel; however, the disposition of the input shaft and the intermediate shaft(s) is not particularly limited. The diameter of the output gear is smaller than the diameter of one of the intermediate gears. This configuration allows the linkage point between the in-wheel motor driving device and the suspension to be located closer to the wheel hub in the hollow area in the road wheel than conventional configurations, without sacrificing the speed reduction ratio of the parallel shaft gear reducer. Note that the speed reduction unit may include only one intermediate shaft or a plurality of intermediate shafts.

Two or more intermediate gears are provided per intermediate shaft. If the speed reduction unit has two intermediate shafts, for example, four or more intermediate gears are provided. In a preferred embodiment of the present invention, the intermediate gears include a final intermediate gear in mesh with the output gear, and the other intermediate gear(s) coaxially coupled to the final intermediate gear, and the other intermediate gear(s) has a diameter greater than the diameter of the output gear. In this configuration, the intermediate gear(s) close to the axis of the output gear can have a large diameter, thereby increasing the speed reduction ratio.

In a preferred embodiment of the present invention, the axis of the output shaft, the axis of the final intermediate gear and the other intermediate gear(s), and the axis of the input gear are located in this order and spaced out in the front-back direction of the vehicle. According to the embodiment, the speed reduction unit and motor unit are disposed obliquely upward with respect to the wheel hub in the hollow area in the road wheel, thereby providing a still larger space below the output gear in the hollow area in the road wheel.

In a preferred embodiment of the present invention, the speed reduction unit includes a plurality of intermediate shafts, and the diameters of the output gear, the final intermediate gear, additional intermediate gears in mesh with the other intermediate gear(s), and the input gear become smaller in this order. According to the embodiment, the diameters of the intermediate gears can be orderly arranged in the driving force transmission path, thereby downsizing the in-wheel motor driving device in the front-back direction of the vehicle.

The present invention can make the diameter of the output gear smaller than conventional one, thereby providing a large space in the hollow area in the road wheel. For instance, if the motor is offset upward with respect to the wheel hub, a space is left below the wheel hub. Alternatively, if the motor is offset forward with respect to the wheel hub in the front-back direction of the vehicle, a space is left backward with respect to the wheel hub. In an embodiment of the present invention, the axis of the final intermediate gear and the other intermediate gear(s) is offset upward with respect to the axis of the output gear. According to the embodiment, the speed reduction unit is offset upward with respect to the wheel hub, thereby providing a large space below the output gear in the hollow area in the road wheel. The term "upward" includes "right above" and "obliquely upward" (the same shall apply hereinafter). In another embodiment, the axis of the final intermediate gear and the other intermediate gear(s) is offset downward with respect to the axis of the output gear. The term "downward" includes "right below" and "obliquely downward" (the same shall apply hereinafter).

In a preferred embodiment of the present invention, the axis of the input gear is offset in the front-back direction of the vehicle with respect to the axis of the output gear. According to the embodiment, the motor unit is offset in the front-back direction of the vehicle or obliquely upward with respect to the wheel hub. This arrangement can provide a still larger space below the output gear in the hollow area in the road wheel.

Advantageous Effects of Invention

As described above, the present invention can bring the linkage point between the in-wheel motor driving device and the suspension closer to the wheel hub in the hollow area in the road wheel. If the suspension receives bending moment applied from the wheel assembly to the wheel hub, the suspension is not affected.

DESCRIPTION OF EMBODIMENT

Figure 1:
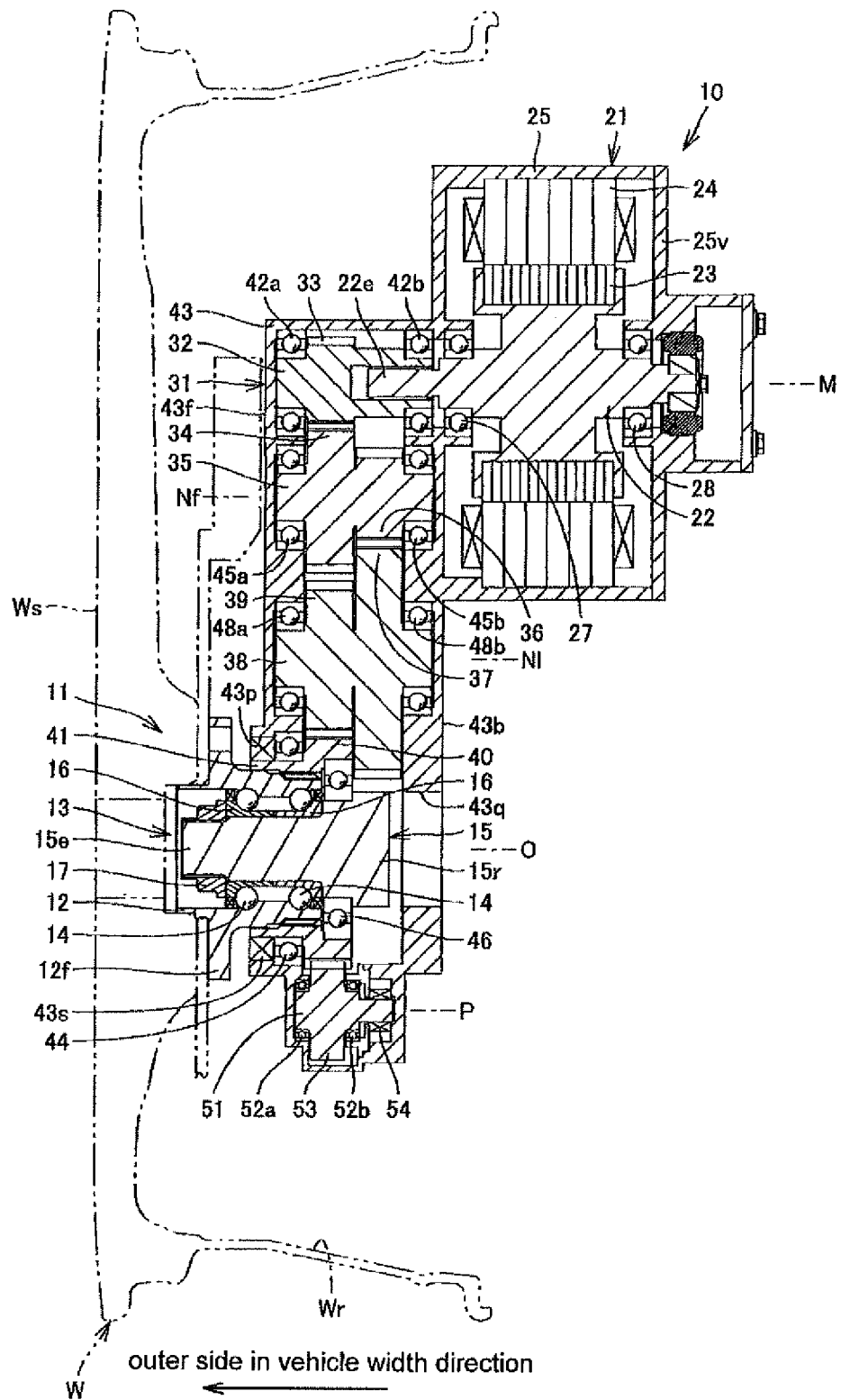
FIG. 1 is a vertical cross-sectional view of an in-wheel motor driving device according to the first embodiment of the present invention, the in-wheel motor driving device being cut along a predetermined plane and developed.
Figure 2:
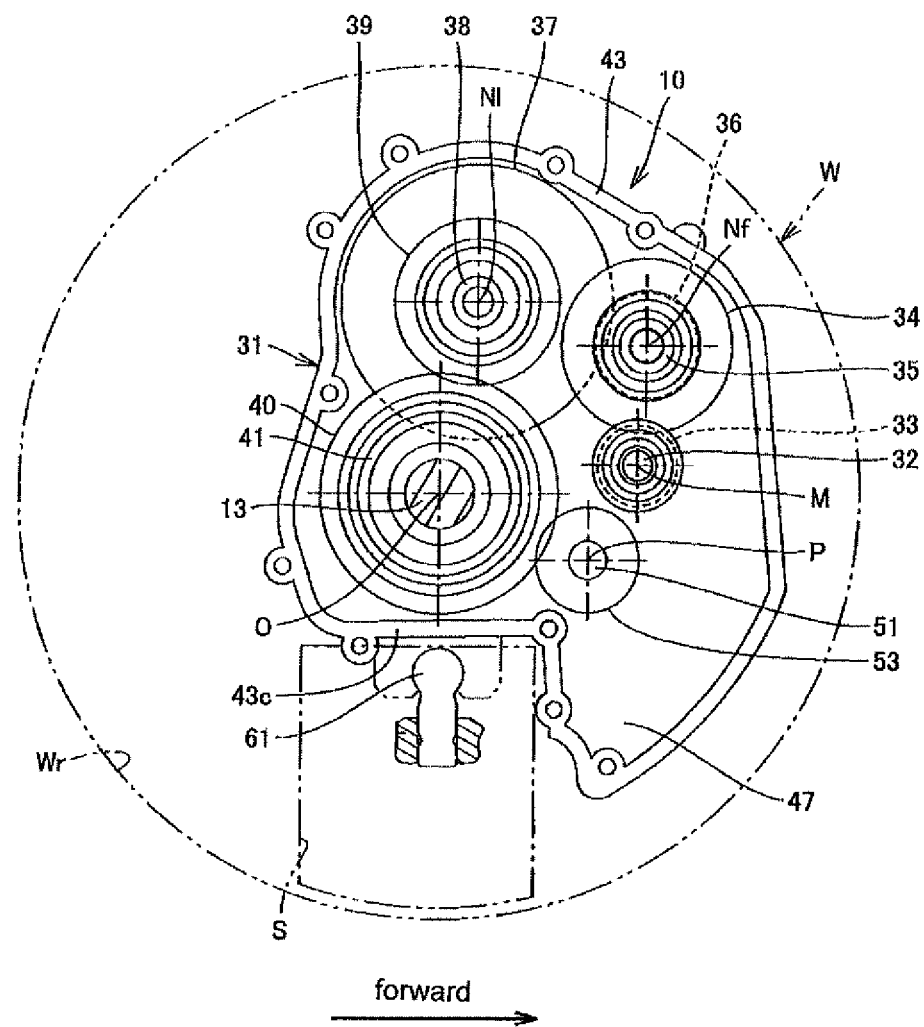
FIG. 2 is a front view showing an interior part of the first embodiment.
Figure 3:
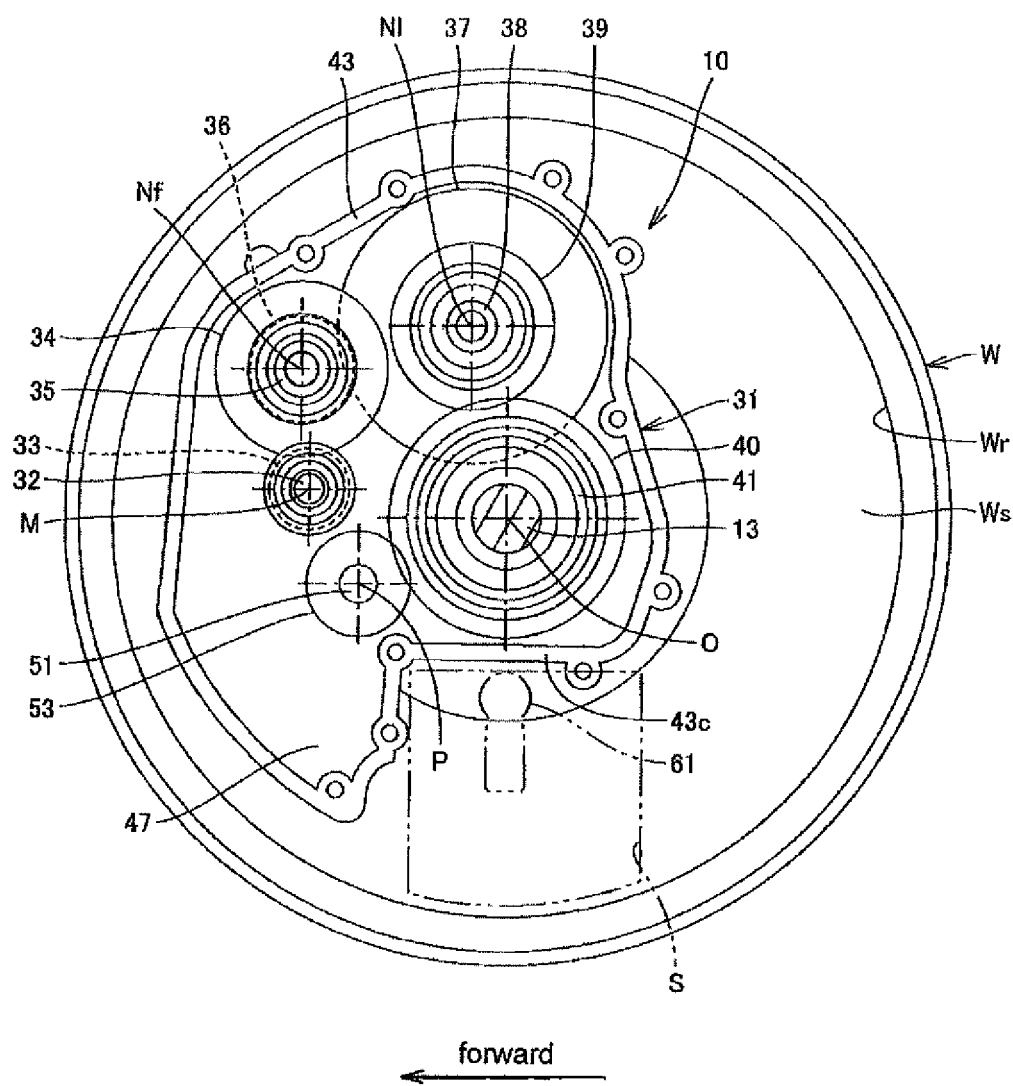
FIG. 3 is a back view showing the interior part of the first embodiment.

With reference to the accompanying drawings, an embodiment of the present invention will be described below. FIG. 1 is a vertical cross-sectional view of an in-wheel motor driving device 10 of the first embodiment of the present invention, the in-wheel motor driving device 10 being cut along a predetermined plane and developed. FIG. 2 is a front view showing the first embodiment, illustrating the interior part of the in-wheel motor driving device 10, viewed from the left side of FIG. 1, with a front part 43f of a main casing 43 removed. The predetermined plane shown in FIG. 1 is a developed plane made by connecting a plane including an axis M and an axis Nf shown in FIG. 2, a plane including the axis Nf and an axis Nl, and a plane including the axis Nl and an axis O in this order. FIG. 3 is a back view showing the first embodiment, illustrating gears inside the in-wheel motor driving device 10, viewed from the right side of FIG. 1, with a motor unit 21 and a back part 43b of the main casing 43 removed from the in-wheel motor driving device 10.

The in-wheel motor driving device 10 includes a wheel hub bearing unit 11 coupled to the center of a road wheel W indicated by a phantom line as shown in FIG. 1, a motor unit 21 driving the road wheel W of a wheel assembly, and a speed reduction unit 31 reducing the rotational speed of the motor unit and transmitting the reduced rotational speed to the wheel hub bearing unit 11, and the in-wheel motor driving device 10 is disposed in a wheel housing (not shown) of an electric vehicle. The motor unit 21 and speed reduction unit 31 are not arranged coaxially with the axis O of the wheel hub bearing unit 11, but are offset from the axis O of the wheel hub bearing unit 11 as shown in FIG. 2. The road wheel W is a well-known road wheel accompanied by a tire, which is not illustrated, fitted around the outer edge of the road wheel W, and is attached to the front left, front right, rear left, and rear right of a vehicle body, which is not illustrated. The vehicle body and wheels assembly construct an electric vehicle. The in-wheel motor driving device 10 can move the electric vehicle at 0 to 180 km/h on public roads.

The wheel hub bearing unit 11 includes an outer ring 12 serving as a wheel hub coupling to the road wheel W, an inner stationary member 13 passing through a center bore of the outer ring 12, and a plurality of rolling elements 14 arranged in an annular gap between the outer ring 12 and inner stationary member 13, and constructs an axle. The inner stationary member 13 includes a non-rotational stationary shaft 15, a pair of inner races 16, and a locknut 17. The stationary shaft 15 has an end portion 15*e* and a root portion 15*r* having a diameter greater than that of the end portion 15*e*. The inner races 16 fit around the outer circumference of the stationary shaft 15 between the root portion 15*r* and end portion 15*e*. The locknut 17 is threadably mounted on the end portion 15*e* of the stationary shaft 15 to hold the inner races 16 between the locknut 17 and root portion 15*r*.

The stationary shaft 15 extends along the axis O, and the end portion 15*e* of the stationary shaft 15 is oriented outward in the vehicle width direction. The root portion 15*r* of the stationary shaft 15 is oriented inward in the vehicle width direction, and is aligned with an opening 43*q* formed in the back part 43*b* of the main casing 43. A bracket, which is not illustrated, is inserted into the opening 43*q* from outside to be attached and secured to the root portion 15*r* in the main casing 43. The bracket is also coupled to a suspension member, which is not illustrated, outside the main casing 43.

The rolling elements 14 are arranged in double rows separately along the axis O. An outer circumferential surface of the inner race 16 on one side along the axis O serves as an inner raceway for the first-row rolling elements 14, and faces an inner circumferential surface on one side of the outer ring 12 along the axis O. An outer circumferential surface of the inner race 16 on the other side along the axis O serves as an inner raceway for the second-row rolling elements 14, and faces an inner circumferential surface on the other side of the outer ring 12 along the axis O. In the following description, the outer side (outboard side) in the vehicle width direction may be referred to as an axially outer side, and the inner side (inboard side) in the vehicle width direction may be referred to as an axially inner side. The right-left direction of FIG. 1 corresponds to the vehicle width direction. The inner circumferential surface of the outer ring 12 constructs an outer raceway for the rolling elements 14.

The outer ring 12 has a flange 12*f* at the axially outer end in the axis-O direction. The flange 12*f* constructs a coupling portion that coaxially couples to a brake rotor, which is not illustrated, and a spoke section Ws of the road wheel W. The outer ring 12 is coupled to the road wheel W with the flange 12*f*, and rotates together with the road wheel W.

The motor unit 21 includes, as shown in FIG. 1, a motor rotary shaft 22, a rotor 23, a stator 24, a motor casing 25, and a motor casing cover 25*v*, that are arranged in this order radially outward from the axis M of the motor unit 21. The motor unit 21 is a radial gap motor of an inner rotor and outer stator type. The motor unit 21 can be other types of motors. For instance, although it is not illustrated, the motor unit 21 can be an axial gap motor.

The axis M that is the center of rotation of the motor rotary shaft 22 and rotor 23 extends in parallel with the axis O of the wheel hub bearing unit 11. In other words, the motor unit 21 is disposed to offset from the axis O of the wheel hub bearing unit 11. Except for an end portion of the motor rotary shaft 22, the axial position of the most part of the motor unit 21 does not overlap the axial position of the inner stationary member 13, as shown in FIG. 1. The motor casing 25 is substantially cylindrical, and has an axially outer end in the axis-M direction coupled to the back part 43*b* of the main casing 43, and an axially inner end in the axis-M direction shielded with the bowl-like motor casing cover 25*v*. The opposite ends of the motor rotary shaft 22 are rotatably supported by the motor casing 25 and motor casing cover 25*v* with rolling bearings 27, 28. The motor unit 21 drives the outer ring 12.

The speed reduction unit 31 includes an input shaft 32, an input gear 33, an intermediate gear 34, an intermediate shaft 35, an intermediate gear 36, an intermediate gear 37, an intermediate shaft 38, an intermediate gear 39, an output gear 40, an output shaft 41, and the main casing 43. The input shaft 32 is a cylindrical component having a diameter greater than that of an end portion 22*e* of the motor rotary shaft 22, and extends along the axis M of the motor unit 21. The end portion 22*e* is received in a center bore formed in an axially inner end of the input shaft 32 in the axis-M direction, resultantly coaxially coupling the input shaft 32 to the motor rotary shaft 22. The input shaft 32 is supported at both ends by the main casing 43 with rolling bearings 42*a*, 42*b*. The input gear 33 is an external gear having a diameter smaller than the motor unit 21, and is coaxially coupled to the input shaft 32. Specifically, the input gear 33 is integrally formed on an outer circumferential surface of the input shaft 32, and is located at a center part of the input shaft 32 in the axis-M direction.

The output shaft 41 is a cylindrical component having a diameter greater than that of the outer ring 12, and extends along the axis O of the wheel hub bearing unit 11. An axially inner end of the outer ring 12 in the axis-O direction is received in a central bore formed in an axially outer end of the output shaft 41 in the axis-O direction, resultantly coaxially coupling the outer ring 12 to the output shaft 41. The axially outer end of the output shaft 41 in the axis-O direction is supported by the main casing 43 with the rolling bearing 44. An axially inner end of the output shaft 41 in the axis-O direction is supported by the root portion 15*r* of the stationary shaft 15 with the rolling bearing 46. The output gear 40 is an external gear, and is coaxially coupled to the output shaft 41. Specifically, the output gear 40 is integrally formed on the outer circumferential surface of the axially inner end of the output shaft 41 in the axis-O direction.

The two intermediate shafts 35, 38 extend in parallel with the input shaft 32 and output shaft 41. Specifically, the speed reduction unit 31 is a parallel four-shaft gear reducer, and the axis O of the output shaft 41, the axis Nf of the intermediate shaft 35, the axis Nl of the intermediate shaft 38, and the axis M of the input shaft 32 extend in parallel with one another, in other words, extend in the vehicle width direction.

In terms of positions of the shafts with respect to the front-back direction of the vehicle, as shown in FIG. 2, the axis M of the input shaft 32 is positioned forward of the axis O of the output shaft 41. The axis Nf of the intermediate shaft 35 is also positioned forward of the axis Nl of the intermediate shaft 38. The axis Nl of the intermediate shaft 38 is positioned forward of the axis O of the output shaft 41, and backward of the axis M of the input shaft 32. In a modification which is not illustrated, the input shaft 32, intermediate shaft 35, intermediate shaft 38, and output shaft 41 may be disposed in this order in the front-back direction of the vehicle. This order is also the order in which a driving force is transmitted.

In terms of positions of the shafts with respect to the up-down direction, the axis M of the input shaft 32 is positioned higher than the axis O of the output shaft 41. The axis Nf of the intermediate shaft 35 is positioned higher than the axis M of the input shaft 32. The axis Nl of the intermediate shaft 38 is positioned higher than the axis Nf of the intermediate shaft 35. In a modification which is not illustrated, the intermediate shaft 35 may be disposed higher than the intermediate shaft 38, but both the intermediate shafts 35, 38 need to be disposed higher than the input shaft 32 and output shaft 41. In an alternative modification which is not illustrated, the output shaft 41 may be disposed higher than the input shaft 32.

The intermediate gear 34 and intermediate gear 36 are external gears, and, as shown in FIG. 1, are coaxially coupled to an axially center part of the intermediate shaft 35 in the axis-Nf direction. The intermediate shaft 35 is supported at both ends by the main casing 43 with rolling bearings 45a, 45b. The intermediate gear 37 and intermediate gear 39 are external gears, and coaxially coupled to an axially center part of the intermediate shaft 38 in the axis-Nl direction. The intermediate shaft 38 is supported at both ends by the main casing 43 with rolling bearings 48a, 48b.

The main casing 43 is formed in the shape of a tube, and, as shown in FIG. 2, encloses the axes O, Nf, Nl, and M which extend in parallel with one another. The main casing 43 is housed in a hollow area in the road wheel W. Referring to FIG. 1, the hollow area is defined by the inner circumferential surface of a rim Wr and the spoke section Ws that is coupled to the axially outer end of the rim Wr in the axis-O direction. The wheel hub bearing unit 11, speed reduction unit 31, and an axially outer part of the motor unit 21 are housed in the hollow area in the road wheel W. An axially inner part of the motor unit 21 protrudes axially inward from the road wheel W. As described above, the road wheel W houses most of the in-wheel motor driving device 10.

Referring to FIG. 2, the main casing 43 projects downward. The projecting part of the main casing 43 is positioned away from the axis O of the output gear 40 in the front-back direction of the vehicle, more specifically, immediately below the axis M of the input gear 33. The projecting part forms an oil tank 47. Between a lower part 43c of the main casing 43, which is positioned immediately below the axis O, and a lower part of the rim Wr formed is a space S. In the space S, a suspension member, which is not illustrated, is disposed so as to extend in the vehicle width direction, and the outer end of the suspension member in the vehicle width direction and the lower part 43c are coupled to each other with a ball joint 61 in a movable manner in any directions.

The main casing 43 houses, as shown in FIG. 1, the input shaft 32, input gear 33, intermediate gear 34, intermediate shaft 35, intermediate gear 36, intermediate gear 37, intermediate shaft 38, intermediate gear 39, output gear 40, and output shaft 41, and also covers the axially inner end of the wheel hub bearing unit 11 in the axis-O direction. Lubricating oil is filled in the main casing 43.

The main casing 43 includes, as shown in FIG. 1, a front part 43f that is substantially flat and covers an axially outer side of a tube-like part of the speed reduction unit 31, and a back part 43b that is substantially flat and covers an axially inner side of the tube-like part of the speed reduction unit 31. The back part 43b is coupled to the motor casing 25. The back part 43b is also coupled to the suspension member, such as a strut, which is not illustrated. Thus, the in-wheel motor driving device 10 is supported by the suspension member.

The front part 43f has an opening 43p through which the outer ring 12 passes. The opening 43p is provided with a seal member 43s that seals the annular gap between the outer ring 12 and the front part 43f. The outer ring 12, serving as a rotating element, is housed in the main casing 43, except for an axially outer end part thereof in the axis-O direction.

The input gear 33 having a small diameter $r_{33}$ and the intermediate gear 34 having a large diameter $r_{34}$ are disposed on the axially outer side of the speed reduction unit 31 and are engaged with each other ($r_{33} < r_{34}$). The intermediate gear 36 having a small diameter $r_{36}$ and the intermediate gear 37 having a large diameter ry are disposed on the axially inner side of the speed reduction unit 31 and engaged with each other ($r_{39} < r_{37}$). The intermediate gear 39 having a small diameter $r_{39}$ and the output gear 40 having a large diameter $r_{40}$ are disposed on the axially outer side of the speed reduction unit 31, and are engaged with each other ($r_{39} < r_{40}$). Thus, the input gear 33, intermediate gears 34, 36, 37, 39, and output gear 40 are engaged with one another, and make up a driving force transmission path from the input gear 33 to the output gear 40 via the intermediate gears 34, 36, 37, 39.

The above-described engagement of the small-diameter driving gears and large-diameter driven gears allows the intermediate shaft 35 to reduce the rotational speed of the input shaft 32, the intermediate shaft 38 to reduce the rotational speed of the intermediate shaft 35, and the output shaft 41 to reduce the rotational speed of the intermediate shaft 38. Thus, the speed reduction unit 31 can provide a sufficient speed reduction ratio. When comparing the output gear 40, intermediate gear 39, intermediate gear 36, and input gear 33, it is found that the diameters thereof become smaller in this order ($r_{40} > r_{39} > r_{36} > r_{33}$). The drawings in FIG. 2 and later represent the gears as addendum circles without depicting individual teeth of the gears.

The intermediate gear 39 in mesh with the output gear 40 serves as the final intermediate gear in the driving force transmission path. When comparing the output gear 40 with the intermediate gear 37, which is coaxially coupled to the intermediate gear 39, in this embodiment, it is found that the diameter $r_{40}$ of the output gear 40 is smaller than the diameter $r_{37}$ of the intermediate gear 37. Making the diameter of the output gear 40 smaller can locate the ball joint 61 closer to the axis O of the axle.

Figure 6:
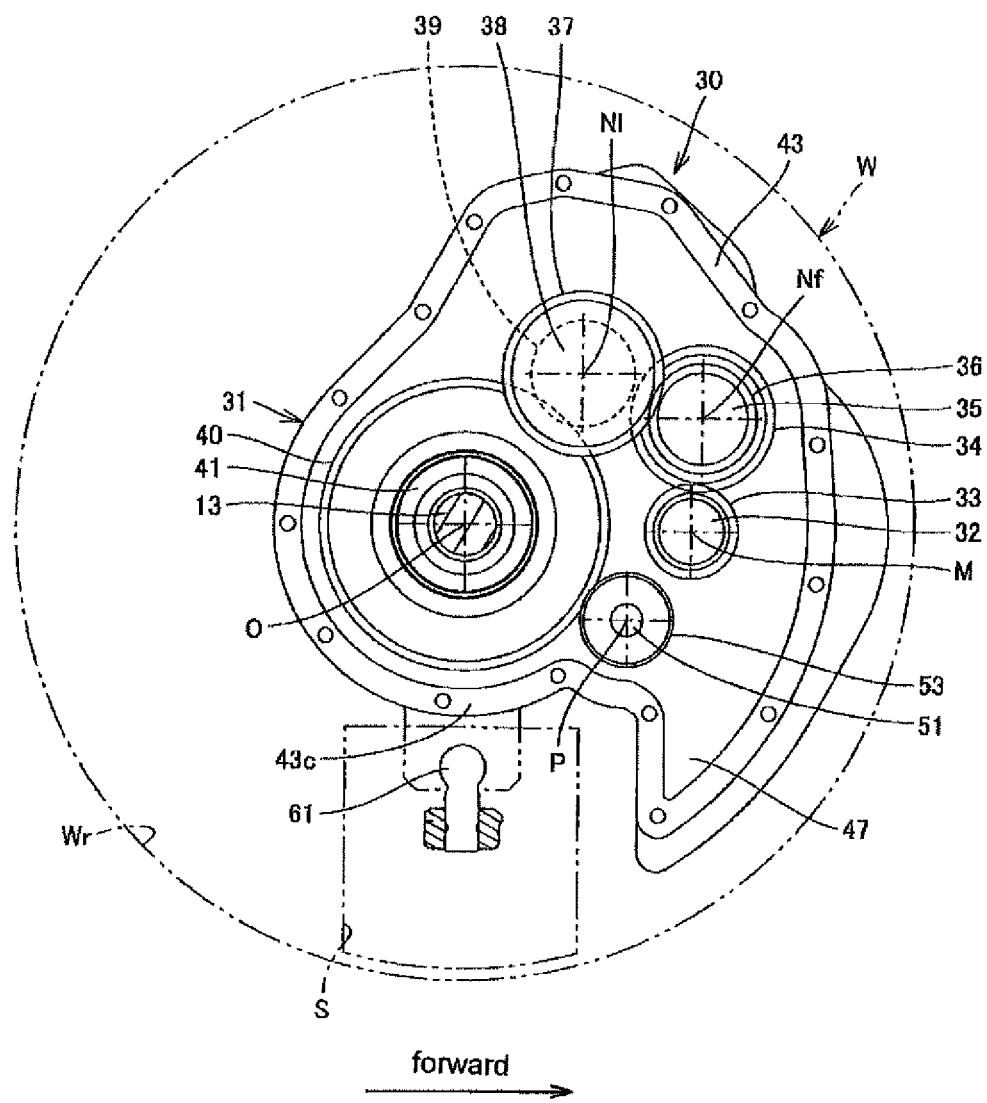
FIG. 6 is a front view of an in-wheel motor driving device according to the second reference example.

In the second reference example given for providing a clear understanding, the output gear 40 has a diameter $r_{40}$ that is greater than the diameter $r_{37}$ of the intermediate gear 37. FIG. 6 is a front view of the in-wheel motor driving device 30 according to the second reference example, showing the internal structure of the speed reduction unit with the front part of the main casing removed. In the second reference example, components common with those in the first embodiment are marked with the same numerals and will not be further explained, but different components will be described below. In the first embodiment, as shown in FIG. 2, the output gear 40 located at a lower position has a diameter smaller than that of the intermediate gear 37 located at an upper position; however, in the second reference example, as shown in FIG. 6, the output gear 40 located at a lower position has a diameter greater than that of the intermediate gear 37 located at an upper position. In addition, the output gear 40 is the gear having the largest diameter in the speed reduction unit 31. Because of this, in the second reference example, the ball joint 61 is located away from the axis O of the axle. The speed reduction ratio of the entire speed reduction unit 31, which corresponds to the rotational speed ratio between the input gear 33 and output gear 40, is substantially the same between the first embodiment (FIG. 2) and the second reference example (FIG. 6).

Figure 7:
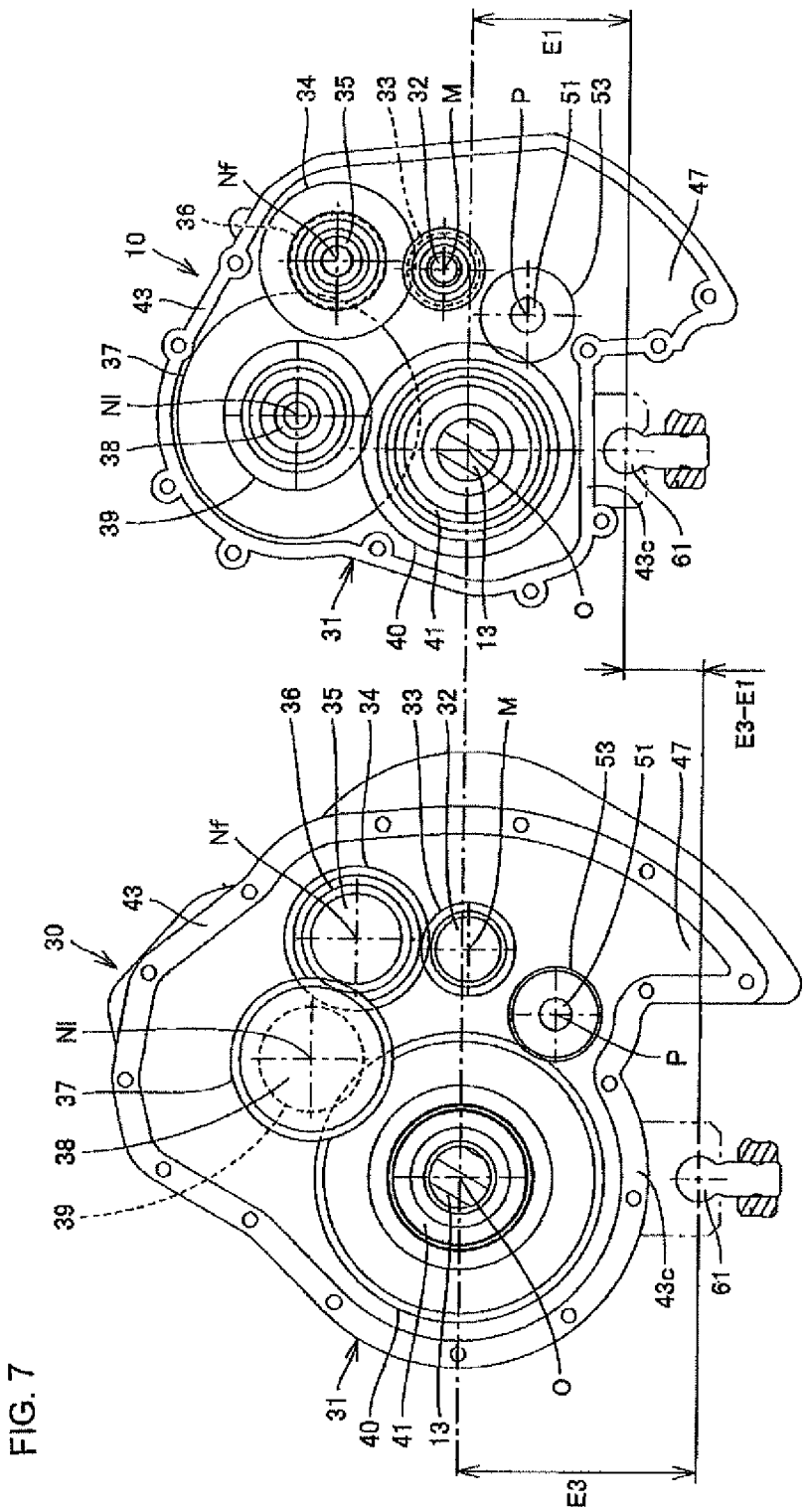
FIG. 7 is a front view showing the contrast between the first embodiment and the second reference example.

FIG. 7 is a front view showing the contrast between the first embodiment and the second reference example. Both are housed in the same road wheels W, respectively. In the in-wheel motor driving device 10 of the first embodiment, the distance from the axis O of the wheel hub bearing unit 11 to the center of the ball joint 61 disposed immediately below the wheel hub bearing unit 11 is indicated by E1. In the in-wheel motor driving device 30 of the second reference example, the distance from the axis O of the wheel hub bearing unit 11 to the center of the ball joint 61 disposed immediately below the wheel hub bearing unit 11 is indicated by E3. The axes O of both the wheel hub bearings 11 are at the same height.

When the distances E3 and E1 are compared, E3>E1, and the ball joint 61 of the first embodiment is designed so as to be disposed closer to the axis O than the ball joint 61 of the second reference example is.

As described above, according to the first embodiment of the present invention, the diameter $r_{10}$ of the output gear 40 is smaller than the diameter $r_{37}$ of the intermediate gear 37. Making the diameter of the output gear 40 smaller can locate the ball joint 61 closer to the axis O of the axle.

According to the first embodiment, the final intermediate gear 39 and the intermediate gear 37 are disposed such that the axis Nl of the intermediate gears 39, 37 is offset upward from the axis O of the output gear 40, and therefore the speed reduction unit 31 is offset upward with respect to the outer ring 12. This arrangement creates a large space S at a lower part, with respect to the outer ring 12, of the hollow area in the road wheel W as shown in FIG. 2.

In addition, according to the first embodiment, the input gear 33 is disposed such that the axis M of the input gear 33 is offset forward from the axis O of the output gear 40 in the front-back direction of the vehicle, and therefore the motor unit 21 is offset forward with respect to the outer ring 12. This arrangement creates a larger space S at a lower part, with respect to the outer ring 12, of the hollow area in the road wheel W as shown in FIG. 2.

Furthermore, according to the first embodiment, the final intermediate gear 39 and the intermediate gear 37 are disposed such that the axis Nl of the intermediate gears 39, 37 is offset forward from the axis O of the output gear 40 in the front-back direction of the vehicle, and therefore the speed reduction unit 31 is offset forward with respect to the outer ring 12. This arrangement creates a still larger space S at a lower part, with respect to the outer ring 12, of the hollow area in the road wheel W as shown in FIG. 2.

According to the first embodiment, the diameters of the output gear 40, final intermediate gear 39, intermediate gear 36, and input gear 33 become smaller in this order. This diameter size change can make the length $F_{31}$ of the speed reduction unit 31 in the front-back direction of the vehicle smaller, thereby downsizing the in-wheel motor driving device 10.

Figure 4:
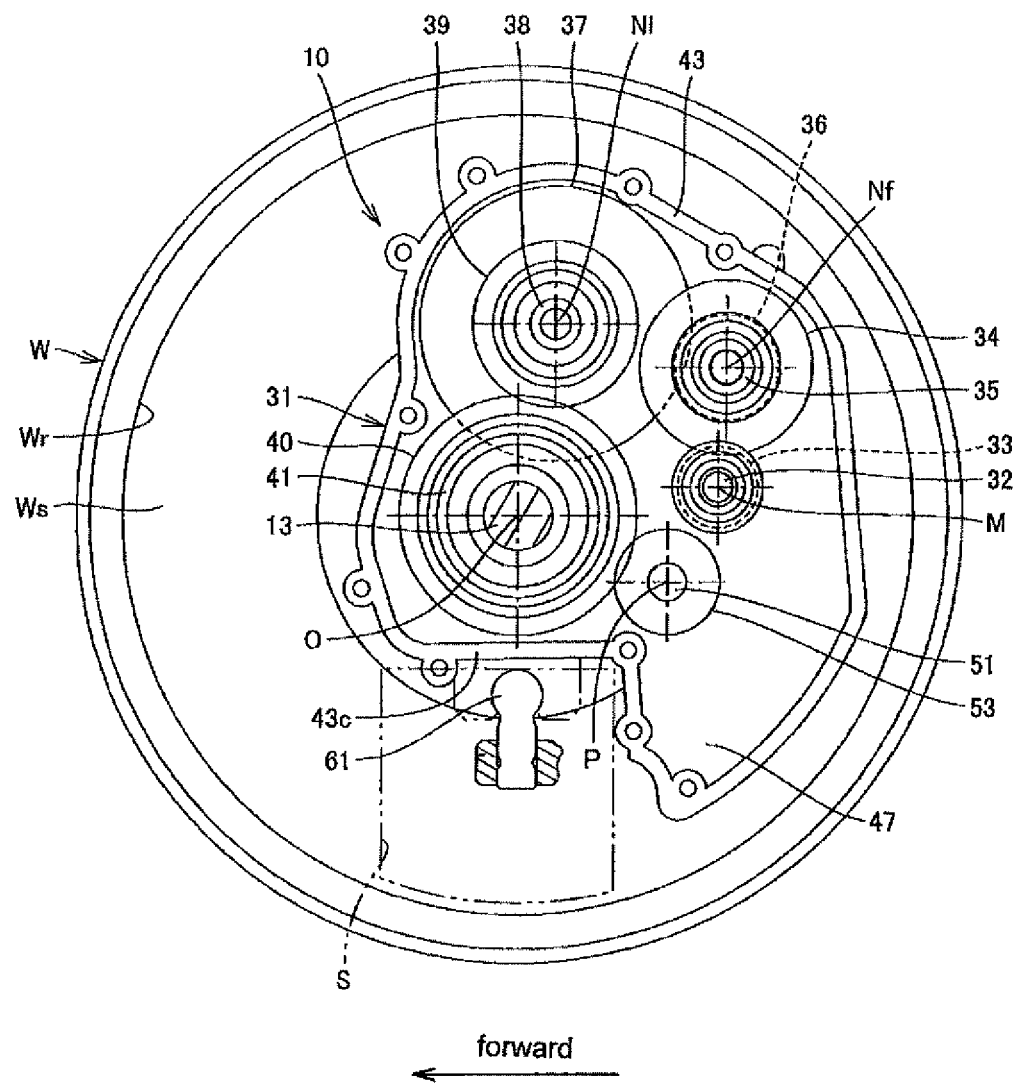
FIG. 4 is a back view showing an interior part of a modification of the first embodiment.
Figure 5:
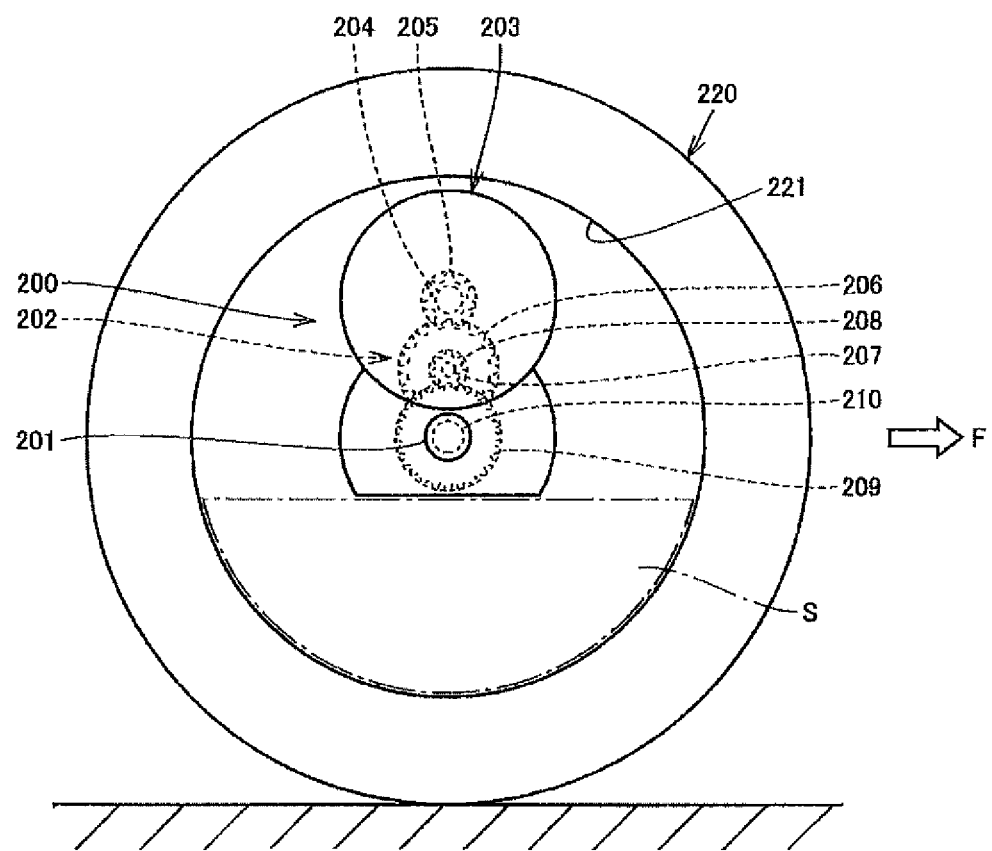
FIG. 5 is a front view of an in-wheel motor driving device according to the first reference example.

The foregoing has described the embodiment of the present invention by referring to the drawings. However, the invention should not be limited to the illustrated embodiment. It should be appreciated that various modifications and changes can be made to the illustrated embodiment within the scope of the appended claims and their equivalents. For instance, although the input shaft 32 in the first embodiment is disposed forward of the output shaft 41 in the front-back direction of the vehicle as shown in FIG. 3, the input shaft 32 in a modification as shown in FIG. 4 may be disposed backward of the output shaft 41 is. The first embodiment shown in FIG. 3 and the modification shown in FIG. 4 share common components, and the components are symmetrically disposed in the front-back direction.

INDUSTRIAL APPLICABILITY

The in-wheel motor driving device according to the present invention is advantageously used in electric vehicles and hybrid vehicles.

REFERENCE SIGNS LIST 10 in-wheel motor driving device
11 wheel hub bearing unit
12 outer ring (wheel hub)
13 inner stationary member
14 rolling element
15 stationary shaft
15r root portion
16 inner race
21 motor unit
22 motor rotary shaft
23 rotor
24 stator
25 motor casing
31 speed reduction unit
32 input shaft
33 input gear
34, 36, 37, 39 intermediate gear
35, 38 intermediate shaft
40 output gear
41 output shaft
43 main casing
43p opening
43s seal member
47 oil tank
51 pump shaft
53 pump gear
54 oil pump
61 ball joint (linkage point)
M, Nf, Nl, O, P axis
S space

The invention claimed is:

1. An in-wheel motor driving device comprising:
a wheel hub bearing unit that rotatably supports a wheel hub extending in a vehicle width direction; a motor unit that drives the wheel hub; and a speed reduction unit that reduces the rotational speed of the motor unit and transmits the reduced rotational speed to the wheel hub bearing unit, wherein
the speed reduction unit includes:
an input shaft coupled to a motor rotary shaft of the motor unit,
an output shaft coupled to the wheel hub and extending in parallel with the input shaft,
one or more intermediate shafts extending in parallel with the input shaft and the output shaft,
an input gear coupled to the input shaft,
an output gear coupled to the output shaft,
a plurality of intermediate gears coupled to the one or more intermediate shafts, and
a main casing, the main casing housing the input shaft, the input gear, the plurality of intermediate gears, the one or more intermediate shafts, the output gear, and the output shaft, the main casing sized to be arranged in a hollow area in a road wheel, the hollow area being defined by an inner circumferential surface of a rim of the road wheel and a spoke section of the road wheel;

wherein the input gear, the intermediate gears, and the output gear are engaged with one another to form a driving force transmission path connecting the input gear to the output gear through the plurality of intermediate gears, and at least one of the intermediate gears has a diameter greater than the diameter of the output gear, and further wherein a space is formed between a lower part of the main casing and a lower part of the rim of the road wheel mounted to the wheel hub, and a linkage point is disposed in the space, the linkage point coupling an outer end of a suspension member extending in a vehicle width direction to the lower part of the main casing.

2. The in-wheel motor driving device according to claim 1, wherein the plurality of intermediate gears include a final intermediate gear in mesh with the output gear, the other intermediate gear(s) coaxially coupled to the final intermediate gear, and the other intermediate gear(s) has a diameter greater than the diameter of the output gear.

3. The in-wheel motor driving device according to claim 2, wherein an axis of the output shaft, an axis of the final intermediate gear and the other intermediate gear(s), and an axis of the input gear are located in this order and spaced out in a front-back direction of a vehicle.

4. The in-wheel motor driving device according to claim 3, wherein the speed reduction unit includes two or more of the intermediate shafts, and the diameters of the output gear, the final intermediate gear, additional intermediate gears in mesh with the other intermediate gear(s), and the input gear become smaller in this order.

5. The in-wheel motor driving device according to claim 1, wherein the intermediate gear having a diameter greater than the diameter of the output gear is disposed such that an axis of the intermediate gear is offset upward with respect to an axis of the output gear.

6. The in-wheel motor driving device according to claim 1, wherein an axis of the input gear is offset from an axis of the output gear in a front-back direction of a vehicle.

* * * * *